United States Patent

[11] 3,577,128

[72] Inventors Tony N. Criscimagna
Woodstock;
Robert J. Fournier, Staatsburg, N.Y.

[21] Appl. No. 790,952
[22] Filed Jan. 14, 1969
[45] Patented May 4, 1971

[73] Assignee International Business Machines Corporation
Armonk, N.Y.

[54] SYNCHRONIZING CLOCK SYSTEM
3 Claims, 3 Drawing Figs.

[52] U.S. Cl. ........................................ 340/172.5, 307/269, 328/63
[51] Int. Cl. ........................................ H03k 3/64
[50] Field of Search ........................................ 340/172.5; 235/157; 328/62, 55, 72; 307/208, 209; 328/63, 75

[56] References Cited

UNITED STATES PATENTS

| | | | |
|---|---|---|---|
| 3,188,484 | 6/1965 | Jorgensen | 307/208 |
| 3,214,695 | 10/1965 | Betz | 328/63 |
| 3,247,491 | 4/1966 | DuVall | 340/172.5 |
| 3,333,246 | 7/1967 | King | 340/172.5 |
| 3,343,136 | 9/1967 | Nyberg | 340/172.5 |
| 3,488,478 | 1/1970 | Gilbert | 307/208X |

*Primary Examiner*—Paul J. Henon
*Assistant Examiner*—R. F. Chapuran
*Attorneys*—Hanifin and Jancin and Joseph J. Connerton

ABSTRACT: In a data processing system, apparatus for synchronizing a slave clock in an input/output device with a master clock in a central processing unit. A set of clock signals from a CPU are received in parallel, converted to serial and pulses are generated in response to the leading and trailing edge of each of the series of signals. The series of pulses is then delayed and shaped to drive a slaved I/O clock. A delay line is adjusted so that the total equivalent system delay is equal to an integral number of CPU pulse durations.

INVENTORS
TONY N. CRISCIMAGNA
ROBERT J. FOURNIER

BY Joseph J Connerton
ATTORNEY

SYNCHRONIZING CLOCK SYSTEM

BACKGROUND OF THE INVENTION

This invention relates to a system for generating synchronous timing pulses in a data processing system, and more particularly, to a system for maintaining synchronization between a master set of timing signals and a slaved set of timing signals generated in response to the master timing signals.

In data processing systems which include synchronous input/output devices it is generally necessary to provide a clock signal from the central processing unit (CPU) to maintain the identity of data. In systems employing a parallel multiline clock, problems arise in synchronizing clocks in input/output (I/O) devices with the CPU clocks due to delays in transmission, delays through logic elements and delays caused by intervening control units.

In the prior art, synchronization of timing signals in an I/O device with timing signals in a CPU was attempted by one of several methods. Among these methods was the "look ahead" approach in which data in an I/O device was generated by an early timing pulse so that when the data was received at the CPU, the inherent system delay would cause the data to be in approximate synchronization with the CPU clock. This approach, however, is only approximate since there is no synchronization between timing signals in the CPU and timing signals in the I/O device.

Another approach has been to attempt synchronization of a clock in an I/O device with a clock in a CPU by inserting a time delay into each of the parallel lines of the CPU clock and transmitting delayed timing signals to the I/O device. This approach is very expensive and it is imprecise in that it is very difficult to align a number of delay lines so that each results in the same total system delay. The multiple delay approach normally results in skewing of the timing pulses. A third approach that has been employed in many systems is placing constraints on the total system delay allowable by requiring that the I/O device be located in close proximity to the CPU and that transmission cables be of a specified maximum length to reduce the total delay and thus eliminate the need for synchronizing circuits. This approach has the inherent disadvantage that there are systems in which the I/O device must be located at a great distance from the CPU with long propogation delays caused by the necessarily long transmission cables.

Accordingly, it is an object of the instant invention to generate a set of slaved clock signals in response to a set of master clock signals which slaved clock signals are in synchronism with said master clock signal.

It is still a further object of the instant invention to synchronize signals transmitted from an I/O device to a CPU with corresponding signals in the CPU so that data thus transmitted may be readily identified.

Briefly, therefore, the instant invention includes first OR circuit means for combining a set of parallel timing signals, a plurality of single shot means for generating impulses in response to the leading and trailing edges of the set of timing signals, second OR circuit means for combining the output of the respective single shots so that a series of impulses representative of the leading and trailing edge of the set of timing signals is produced. A delay line is connected to the second OR circuit means so that the series of impulses will be delayed, a time duration that will result in a total system propogation delay of an integral number of CPU clock pulse durations. A drive circuit is connected to the output of the delay line to drive a multistage counter which generates parallel timing signals in response to the delayed impulses.

For each system configuration including cable delays and intervening control units, a single adjustment of the delay line resulting in complete synchronization of the I/O clock with the CPU clock.

The foregoing and other objects, features and advantages of the instant invention will be apparent from the following more particular description of a preferred embodiment of the invention as illustrated in the accompanying drawings.

DETAILED DESCRIPTION OF THE INVENTION

Figure 1:
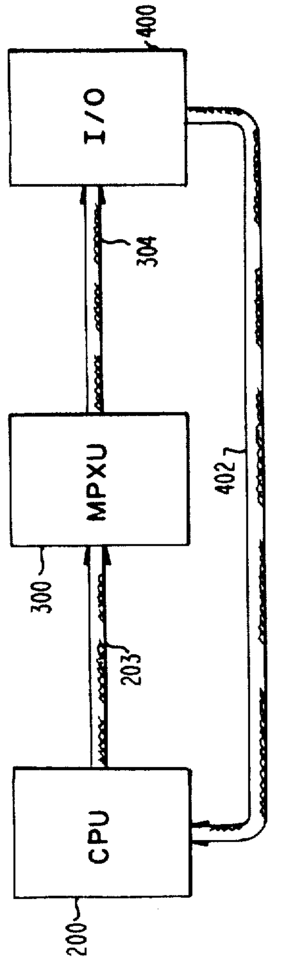
FIG. 1 is a block diagram showing a system configuration in which the synchronous clock system operates.

Referring now to FIG. 1, a block diagram of a data processing system, clocking signals are transmitted from CPU 200 along lines 203 to multiplexer unit 300. Multiplexer unit 300 passes the clocking signals along lines 304 to I/O device 400. To provide identification of data transmitted from I/O device 400 to CPU 200, a set of slaved timing signals are transmitted from the I/O device to the CPU along lines 402.

Figure 2:
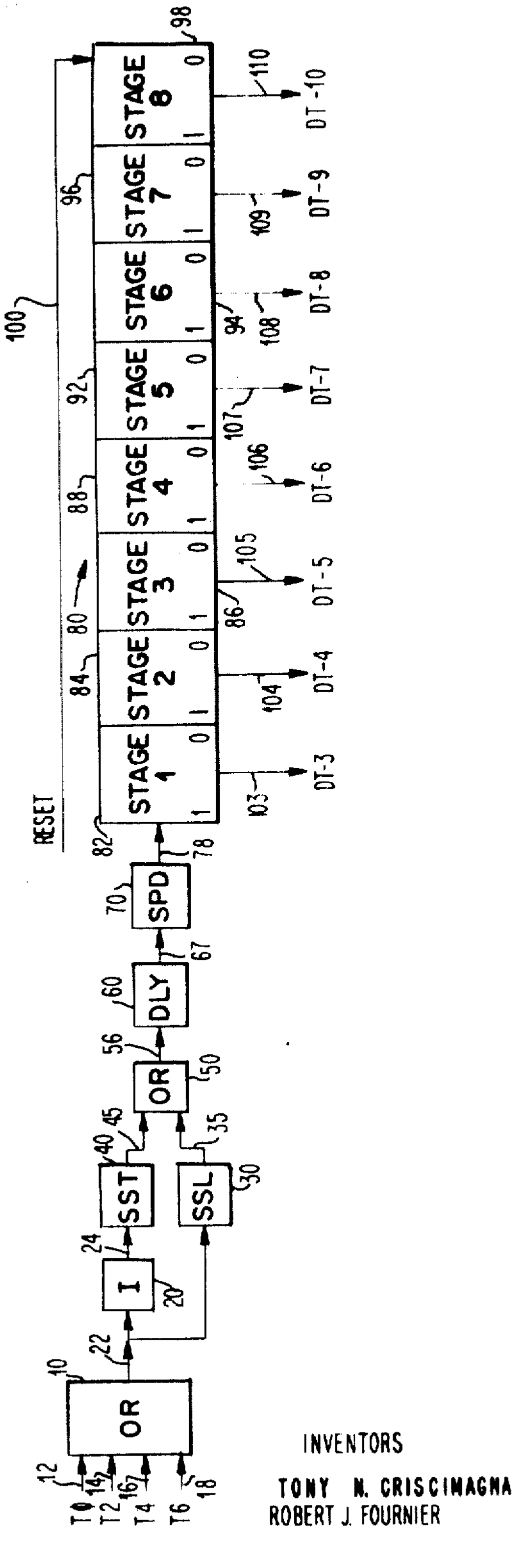
FIG. 2 is a schematic clock diagram of circuitry particularly suitable for embodying the instant invention.

Referring now to FIG. 2, a detailed block diagram of the apparatus for synchronizing a set of slaved timing signals with a set of master timing signals, it is to be noted that only the even numbered pulses of the set of master timing signals are used. Lines carrying master timing signals T0, T2, T4 and T6 are connected from the CPU to the input of the synchronizing apparatus with timing signals T0 being presented on lines 12, T2 on line 14, T4 on line 16 and T6 on line 18. Lines 12, 14, 16 and 18 are connected to the respective inputs of OR circuit 10. Line 22 connects the output of OR circuit 10 with the inputs of inverter 20 and leading edge single shot 30. The output of leading edge single shot 30 is connected to one input of OR circuit 50 by line 35. The output of inverter 20 is connected to a trailing edge single shot 40 by line 24. The output of trailing edge single shot 40 is connected to another input of OR circuit 50 by line 45. The output of OR circuit 50 is connected to the input of delay line 60 by line 56. The input of pulse driver 70 is connected to the output of delay line 60 by line 67. The output of pulse driver 70 drives I/O clock counter 80 being connected to the input of the first stage 82 by line 78.

I/O clock counter 80 is an 8 stage binary counter of the type well known in the art comprising a plurality of stages wherein each stage includes a gated bistable flip-flop.

The output of the first stage 82 of counter 80 is connected to line 103 for utilization within the I/O device and for transmission to the CPU. Line 103 is labeled DT–3 indicating that this is a delayed timing signal which will arrive at the CPU in synchronism with the T3 pulse of the CPU clock. Since DT–3 is generated in response to T0, this represents a delay of three pulse durations of the CPU clock. The second stage 84 of I/O clock counter 80 is connected to line 104 labeled DT–4. The third stage 86 is connected to line 105 labeled DT–5. Stage 4, 88 is connected to line 106 labeled DT–6. Stage 5, 92 is connected to line 107 labeled DT–7. Stage 6, 94 is connected to line 108 labeled DT–8. Stage 7, 96 is connected to line 109 labeled DT–9. Stage 8, 98 is connected to line 110 labeled DT–10. Timing signals DT–3 through DT–10 represent the I/O clock wherein each succeeding pulse rises on the fall of the preceding pulse. I/O clock counter 80 is placed in its initial state by reset line 100 which is connected to the set input of stage 8, 98.

OPERATION OF THE INVENTION

Figure 3:
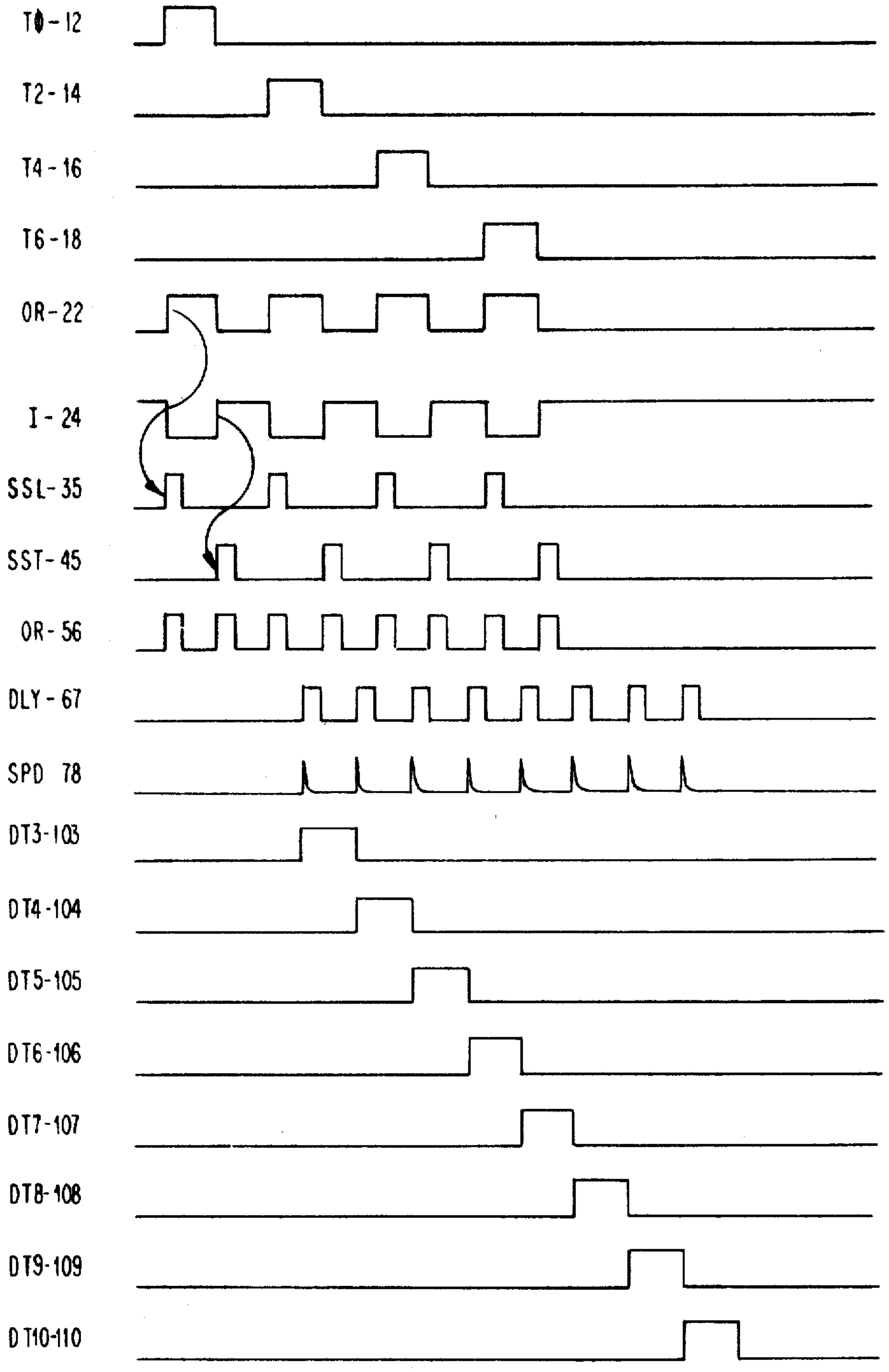
FIG. 3 is a timing chart illustrating the progression of signals through the circuitry of FIG. 2.

To gain a complete understanding of the operation of the instant invention, it will be necessary throughout to refer to FIGS. 2 and 3.

The present invention requires that only alternate timing signals of the master set of timing signals from the CPU be transmitted to the I/O device. Thus, the inputs of the combining means 10 are T0, T2, T4 and T6 which represent the even pulses of the CPU clock. As seen in FIG. 3, pulses T0 occurs first in time followed by T2, 2 time pulse units later than T4, another 2 time pulse units later and finally T6 which is also 2 time pulse units later than T4. Combining means 10 produces on line 22 the output signal shown. This signal is applied to inverter 20 and to leading edge single shot 30. On each positive going rise of the output of the combining means 10, single shot 30 produces a short impulse. Inverter 20 inverts the signal from the combining means 10 so that trailing edge single shot 40 will produce a short impulse in response to the trailing edge of each of the signals appearing on line 22.

The output of leading edge single shot 30 which appears at line 35 and the output of trailing edge single shot 40 which appears at line 45 are then combined in OR circuit 50 which presents on line 56 a series of impulses which represent the leading and trailing edge of the alternate timing pulses of the CPU clock or, in other terms, the leading edge of each timing pulse position of the CPU clock.

This series of impulses is then delayed by delay line 60 a duration of time necessary to insure that clock signals generated in the I/O device and transmitted to the CPU arrive at the CPU in synchronism with later occurring CPU clock pulses.

Delay means 60 is manually adjusted by connection to an appropriate tap according to the formula:

$$D=N(t_c)-t_{pd}$$

where

N is an integer $t_c$ is the time duration of a master clock pulse $t_{pd}$ is the total propogation and logic delay time and D is the total time delay of delay means 60.

The output of delay line 60 is then transmitted to sample pulse driver 70 which is a power amplifier capable of supplying enough pulse current to drive I/O clock counter 80.

I/O clock counter 80 is set to its initial condition with stage 8, 98 in the 1 position and all other stages in the 0 position by reset line 100. As the delayed timing pulses are applied to I/O clock counter 80 a series of timing signals is generated in which the trailing edge of each pulse is coincident in time with the leading edge of each succeeding pulse so that a parallel set of timing signals as shown in FIG. 3 by line 103 through 110.

The output lines of I/O clock counter 80 are labeled to indicate the CPU clock pulse with which each will be in synchronism when it arrives at the CPU. Thus, DT–3 arrives at the CPU at T3 time, DT–4 at T4 time, DT–5 at T5 time, DT–6 at T6 time, and DT–7 at T7 time. DT–8, DT–9 and DT–10 represent I/O clock timing pulses which have no direct equivalent in the CPU clock. In a cyclic operation DT–8 would be equal to T0, DT–9 to T1 and DT–10 to T2 in the CPU clock. In a cycle steal operation, DT–8, DT–9 and DT–10 represent operations which continue in the I/O device while the CPU is idle.

An example, of the conditions which would require the instant invention, is as follows: If the CPU clock total cycle time is equal to 4 microseconds divided into 8 pulses of 500 nanoseconds each, and if the total propogation delay due to transmission cables is equal to 1 microsecond, and if the total delay due to logic circuits is equal to 250 nanoseconds;

if T0 were transmitted from the CPU to the I/O device and then back to the CPU, it would arrive 1,250 nanoseconds late or approximately in the center of the T2 pulse since the total propagation delay $T_{pd}$ is equal to the total transmission cable delay $T_p$ plus the total logic delay $T_1$. This is not acceptable since signals in the I/O device would then not be in synchronism with signals in the CPU.

Therefore, in accordance with the instant invention, delay line 60 would be adjusted to provide a time delay of 250 nanoseconds so that the total system delay would then be equal to 1,500 nanoseconds or 3 CPU clock pulse time durations. This would result in the original T0 arriving at the CPU in synchronism with T3. To avoid confusion, the timing signals generated within the I/O device and transmitted to the CPU are relabeled to indicate the CPU timing pulse with which they will be in synchronism when arriving at the CPU.

Each of the circuits shown in block form in FIG. 2 are elements which are well known to those of ordinary skill in the art and may be implemented in a variety of configurations and technologies. Therefore, detailed description of each of the blocks of the preferred embodiment shown in FIG. 2 is considered to be surplus and is not included in the specification.

While the invention has been particularly shown and described with reference to a preferred embodiment thereof, it will be understood by those skilled in the art that various changes in form and detail may be made therein without departing from the spirit and scope of the invention.

We claim:

1. Apparatus for synchronizing a first set of periodic timing signals from a first device with a second set of periodic timing signals from a second device comprising:
   - combining means for combining said first set of timing signals to form a series of signals spaced in time, wherein each of said series of signals has a leading edge and a trailing edge;
   - generating means connected to the output of said combining means for generating a series of impulses responsive to said leading and trailing edges of each of said series of signals;
   - delay means, connected to the output of said generating means for delaying said series of impulses a duration of time equal to N timing signal durations, of said first set of timing signals, minus all accumulated transmission time delays between said first device and said second device where N is an integer;
   - counter means for generating said second set of periodic timing signals in response to and in synchronism with said delayed series of impulses thereby achieving synchronization between said first and second sets of periodic timing signals.

2. Apparatus according to claim 1, wherein:
   - said first device is a central processor unit of a data processing system;
   - said second device is an input/output unit of a data processing system;
   - said combining means is a logical OR circuit; and
   - said generating means comprises a plurality of single shot monostable circuits, a first of which generates an impulse in response to the leading edge of each of said series of signals and a second of which generates a series of impulses in response to the trailing edge of each of said series of signals; and
   - said counter means comprises a plurality of gated bistable flip-flop circuits each of which changes state from the off condition to the on condition in response to a change in the state from the on condition to the off condition of the preceding stage.

3. Apparatus according to claim 1, wherein said first set of timing signals comprises alternate pulses from a master set of timing signals.